United States Patent
Bahari et al.

(10) Patent No.: US 7,982,175 B2
(45) Date of Patent: Jul. 19, 2011

(54) MINIATURIZED SINGLE TRACK OPTICAL ENCODER SYSTEM WITH INTEGRATED INDEX CHANNEL(S)

(75) Inventors: Saidan Saiful Bahari, Penang (MY); Tengku Norazman Bin Tengku Abd Aziz, Selangor D.E. (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 217 days.

(21) Appl. No.: 12/495,786

(22) Filed: Jun. 30, 2009

(65) Prior Publication Data
US 2010/0327152 A1  Dec. 30, 2010

(51) Int. Cl.
*G01D 5/34* (2006.01)
(52) U.S. Cl. .................. 250/231.13; 356/616; 341/13
(58) Field of Classification Search ......... 250/231.13–231.18; 356/616; 341/13
See application file for complete search history.

(56) References Cited

U.S. PATENT DOCUMENTS

| | | | |
|---|---|---|---|
| 7,309,855 B2 | 12/2007 | Nagasaka et al. | |
| 7,342,671 B2 | 3/2008 | Ito | |
| 7,420,157 B2 | 9/2008 | Kuroda | |
| 7,495,583 B2 | 2/2009 | Tan et al. | |
| 2008/0111061 A1* | 5/2008 | Wong et al. | 250/231.13 |
| 2009/0206244 A1* | 8/2009 | Bahari et al. | 250/231.13 |
| 2010/0155586 A1* | 6/2010 | Chin et al. | 250/231.1 |
| 2010/0301195 A1* | 12/2010 | Thor et al. | 250/231.13 |

OTHER PUBLICATIONS

"Recent Trends of Linear and Angular Psuedorandom Encoder Development," Denic et al. International Symposium on POwer Electronics, Electric Drives, Automation and Motion, Oct. 2006.

* cited by examiner

*Primary Examiner* — Seung C Sohn

(57) ABSTRACT

Disclosed are various embodiments of a reflective optical encoder system having at least three channels—two data channels and at least one index channel. The various configurations of reflective optical encoders disclosed herein permits very high resolution reflective optical encoders in small packages to be provided. In addition, the embodiments of the reflective optical encoder systems disclosed herein reduce problems associated with misalignment between code scales and light detectors, permit relatively simple electronic circuitry to be used to process outputs, and reduce manufacturing, assembly, integrated circuit and encoder costs. Methods of making and using such optical encoders are also disclosed.

31 Claims, 7 Drawing Sheets

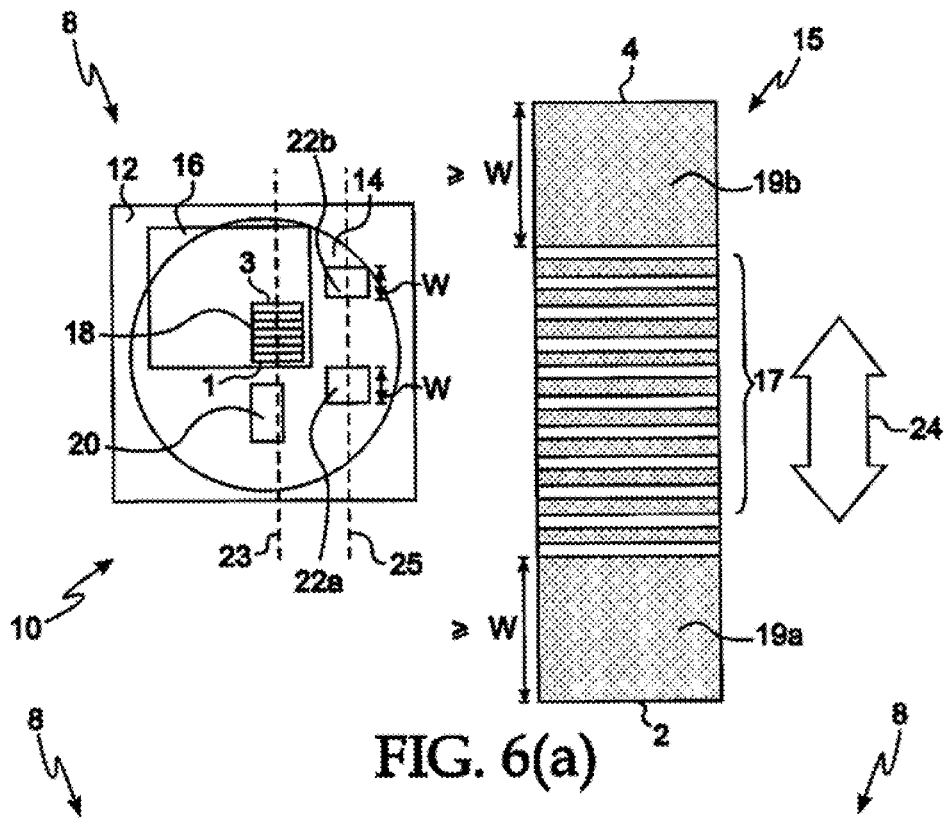
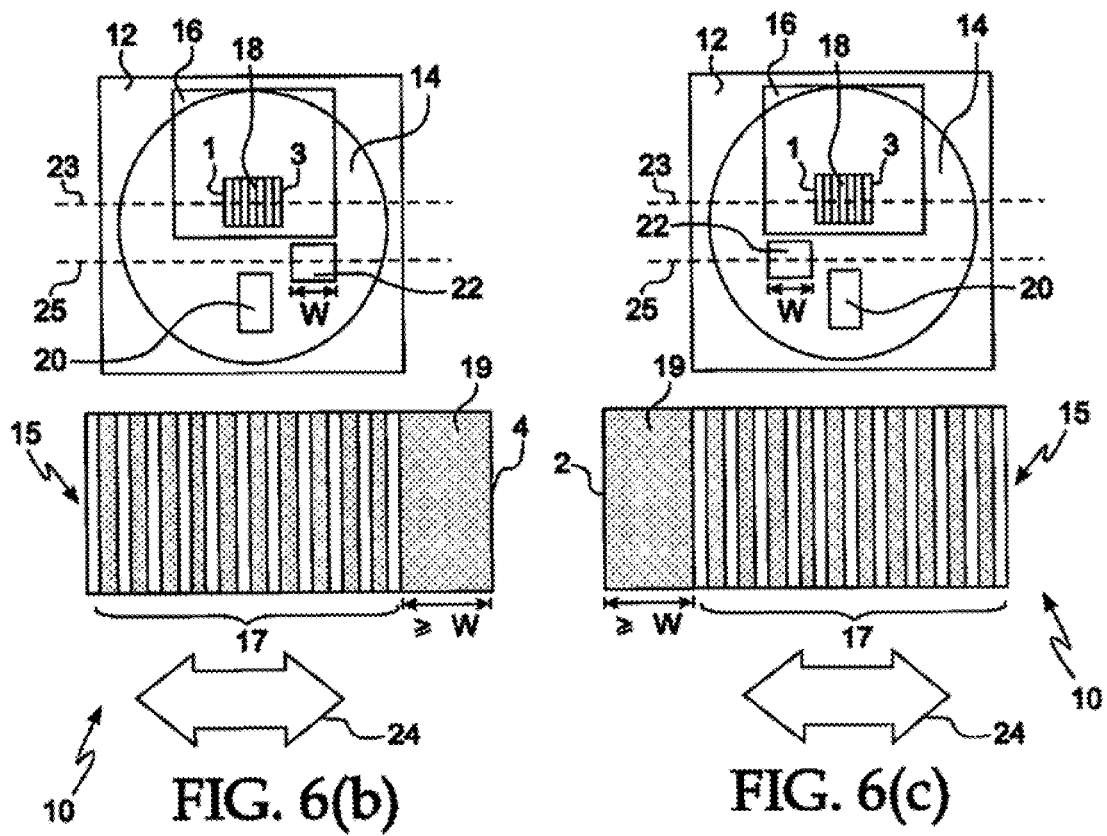
FIG. 6(a)
FIG. 6(b)  FIG. 6(c)

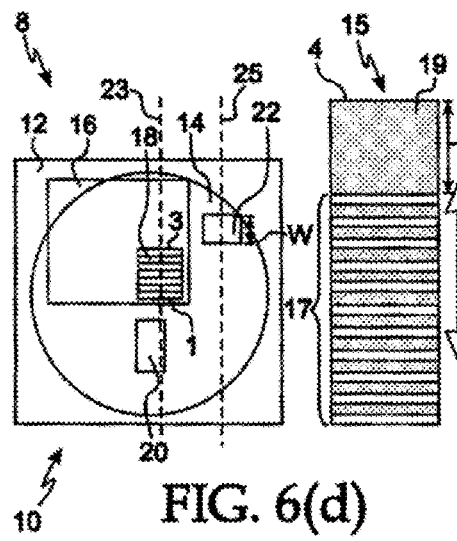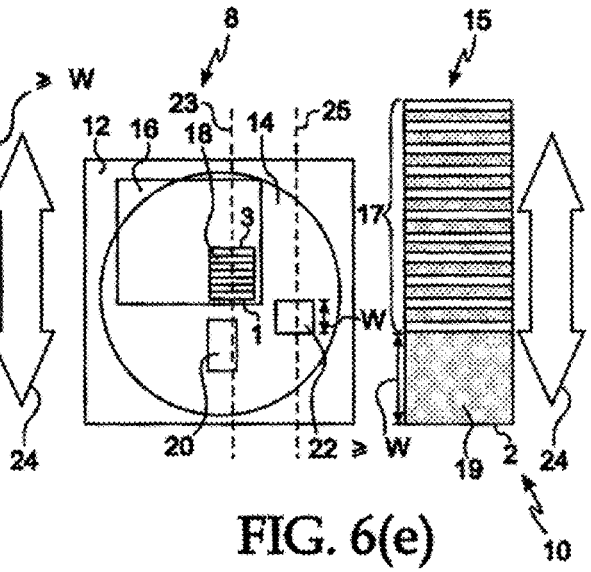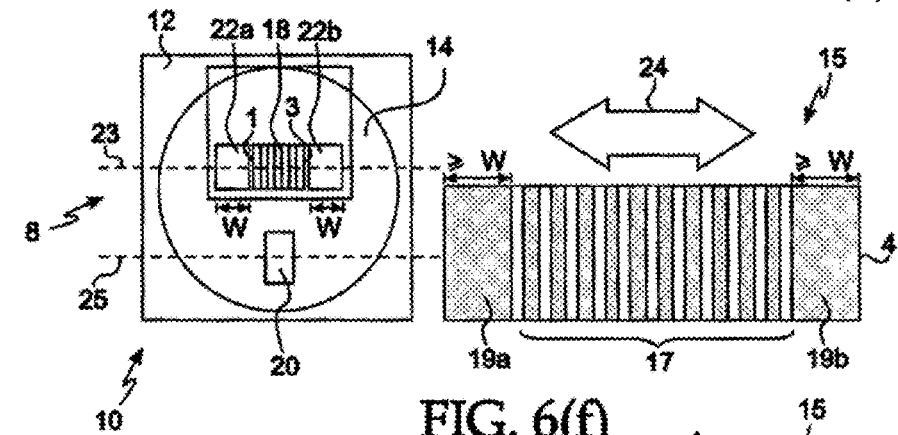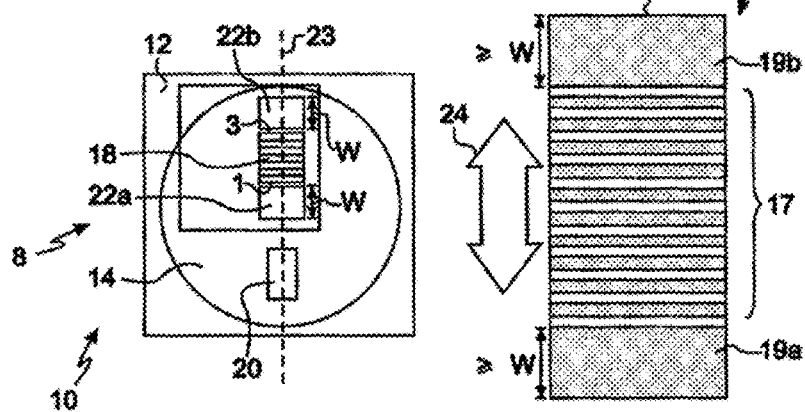

MINIATURIZED SINGLE TRACK OPTICAL ENCODER SYSTEM WITH INTEGRATED INDEX CHANNEL(S)

FIELD OF THE INVENTION

Various embodiments of the inventions described herein relate to the field of optical encoders, and components, devices, systems and methods associated therewith.

BACKGROUND

Optical encoder systems are typically employed as motion detectors in applications such as closed-loop feedback control in motor control systems. By way of example, many optical encoder systems are configured to translate rotary motion or linear motion into a two-channel digital output for position encoding.

Many optical encoder systems employ an LED as a light source. In transmissive encoder systems, the light is collimated into a parallel beam by means of a lens located over the LED. Opposite the emitter is a light detector that typically consists of photo-diode arrays and a signal processor. When a code scale such as a code wheel or code strip moves between the light emitter and light detector, the light beam is interrupted by a pattern of bars and spaces disposed on the code scale. Similarly, in reflective or imaging encoder systems, the lens over an LED focuses light onto the code scale. Light is either reflected or not reflected back to the lens disposed over the photodetector. As the code scale moves, an alternating pattern of light and dark patterns corresponding to the bars and spaces falls upon the photodiodes. The photodiodes detect these patterns and corresponding outputs are processed by the signal processor to produce digital waveforms. Such encoder outputs are used to provide information about position, velocity and acceleration of a motor, by way of example.

In some three channel optical encoder systems, an index channel light detector is provided comprising photodiode arrays I and I/. Such encoders require increased surface area and package size to implement, however, and also suffer from an increased probability of misalignment between the code scale and the light detectors, seeing as light detectors are required over an increased surface area. Manufacturing costs and times are also typically increased in such an approach because specialized optical alignment equipment and steps are required. See, for example, U.S. Pat. No. 4,451,731 to Leonard.

In other three-channel optical encoder systems, an additional track is provided by a reference mark imprinted on a code strip or code wheel and photointerrupters disposed well to either end of an encoder. The reference mark is typically placed near the end of a code strip or code wheel, and is used to provide an indication that a complete linear motion (or motion limit) of a motor or other device connected to the encoder has been completed or achieved. When the motor or other device reaches its end-of-motion or other limit, a digital signal is generated by the encoder, which is employed in a feedback loop to stop the motor or other device from moving further.

Such an encoder system 10 is illustrated in FIG. 1, where encoder 8 is disposed on lower substrate 9 and below code scale 15, which is configured to move laterally above encoder 10. Photointerrupters/photodiodes 5 and 7 are disposed well from both ends of encoder 8, and are configured to detect an end-of-motion or limit signal generated by either end of code scale 15 being located directly thereabove. As will be appreciated, the prior art system of FIG. 1 is relatively large owing to photointerrupters/photodiodes 5 and 7 being located a fair distance from both ends of encoder 8. Moreover, the use of photointerrupters/photodiodes 5 and 7 requires that components in addition to encoder 8 be used, and that electrical connections be established to such components using, for example, extra lengths of flex cable. These factors result in an optical encoder system that is relatively large, requires additional steps in the manufacturing process to assemble the photointerrupter and related components, and also lower production output and increase cost.

A three-channel optical reflective encoder system is disclosed in U.S. Pat. No. 7,394,061 to Bin Saidan et al. (hereafter "the '061 patent"). In the '061 patent, a third index channel output signal is provided through the relatively complicated processing of signals corresponding to the A, A/, B and B/ data channels. In such an encoder, considerable resources and time must be devoted to designing the complex output circuitry required to produce the index channel output signal. In addition, the outputs provided by the data and index channels may be degraded if the total currents generated by light detectors are insufficient to produce the required output signals. As a result, at least certain pairs of A, A/, B and B/ channels cannot be employed to produce the index channel output signal. At higher resolutions, the two-channel design of the '061 patent fails, as the widths and corresponding surface areas of the data channel light detectors are small and the current they generate is insufficient to generate an index output pulse. Additional electronic circuitry is therefore required to increase photodiode current.

Referring now to FIG. 2, there is shown a conventional two-channel optical encoder 8 comprising integrated circuit 16 having single track light detector 18 forming a portion thereof, and mounted on encoder substrate 12. Single track light detector 18 comprises A, A/, B and B/ data channel photodiodes, as is known in the art. Light emitter 20 emits light upwardly towards a code scale (not shown in FIG. 1), where light is reflected downwardly towards single track light detector 18 through single dome lens 14. FIG. 3 shows conceptually how the size of integrated circuit 16 is increased when additional conventional indexing circuitry and corresponding indexing photodiode(s) are added to single track light detector 18 to form a three-channel optical encoder 8. In FIG. 3, border 6 represents the increased surface area consumed by three-channel integrated circuit 16 of FIG. 3 with respect to two-channel integrated circuit 16 of FIG. 2. The additional indexing circuitry and photodiodes of integrated circuit 16 in FIG. 3 prevent the resulting optical encoder package from being made small, and also result in considerable space in integrated circuit 16 being unused and therefore wasted.

The market demands ever smaller and higher resolution optical reflective encoder systems that can be provided without the use of complicated, expensive, signal processing output circuitry and without the use of photointerrupters mounted on large substrates that inhibit or prevent system miniaturization.

SUMMARY

In some embodiments, there is provided a reflective optical encoder system comprising an encoder, the encoder comprising a surface mount substrate, a light emitter disposed on the substrate and configured to emit light therefrom, an array of light detectors disposed on the substrate and arranged along a common axis to form a single track light detector having first and second ends, the single track light detector having disposed along the axis a plurality of alternating sequences of pairs of A and B data channel light detectors and A/ and B/ data channel light detectors, the A and A/ light detectors, and the B and B/ light detectors, respectively, being arranged 90 degrees out of phase with respect to one another, the axis being oriented along and parallel to an azimuth, and at least a first index channel light detector disposed on the substrate and having a light-detecting portion of about a first width W as measured in the direction of the azimuth, a code scale comprising data strips and at least a first substantially non-reflective index strip located at a third end of the code scale, the code scale being configured to travel parallel to the axis and above the encoder, the code scale being located and configured operably in respect of the encoder such that at least portions of light emitted from the light emitter are reflected from the code scale towards the single track light detector and the index channel light detector, wherein the light emitter, the single track light detector and the index channel light detector are operably connected to processing circuitry, the index channel light detector is located adjacent to the first end or the second end of the single track light detector, the index channel light detector does not overlap with the single track light detector anywhere along the axis, the first index strip has a second width greater than or equal to about W as measured in the direction of the azimuth, and as the first index strip moves along the azimuth and into alignment with the index channel light detector a first end-of-motion or limit signal is generated by the processing circuitry.

In other embodiments, there is provided a method of making a reflective optical encoder system comprising making an encoder comprising attaching a light emitter to a substrate, the light emitter being configured to emit light therefrom, attaching an array of light detectors on the substrate and arranging the array of light detectors along a common axis to form a single track light detector having first and second ends, the single track light detector having disposed along the axis a plurality of alternating sequences of pairs of A and B data channel light detectors and A/ and B/ data channel light detectors, the A and A/ light detectors, and the B and B/ light detectors, respectively, being arranged 90 degrees out of phase with respect to one another, the axis being oriented along and parallel to an azimuth, and attaching at least a first index channel light detector on the substrate having a light-detecting portion of about a first width W as measured in the direction of the azimuth, and making a code scale comprising data strips and at least a first substantially non-reflective index strip located at a third end of the code scale, and configuring the code scale to travel parallel to the axis and above the encoder such that the code scale is located and configured operably in respect of the encoder such that at least portions of light emitted from the light emitter are reflected from the code scale towards the single track light detector and the index channel light detector, wherein the light emitter, the single track light detector and the index channel light detector are operably connected to processing circuitry, the index channel light detector is located adjacent to the first end or the second end of the single track light detector, the index channel light detector does not overlap with the single track light detector anywhere along the axis, the first index strip has a second width greater than or equal to about W as measured in the direction of the azimuth, and as the first index strip moves along the azimuth and into alignment with the index channel light detector a first end-of-motion or limit signal is generated by the processing circuitry.

Further embodiments are disclosed herein or will become apparent to those skilled in the art after having read and understood the specification and drawings hereof.

BRIEF DESCRIPTION OF THE DRAWINGS

Different aspects of the various embodiments of the invention will become apparent from the following specification, drawings and claims in which:

FIGS. 6(a) through 6(g) illustrate still further embodiments of reflective optical encoders 10 having index channel light detectors 22 or 22a and 22b incorporated therein.

The drawings are not necessarily to scale. Like numbers refer to like parts or steps throughout the drawings, unless otherwise noted.

DETAILED DESCRIPTION OF SOME PREFERRED EMBODIMENTS

In various embodiments of the invention, three-channel single track reflective optical encoder systems, devices and methods, are provided.

As employed herein, the term "single track encoder system" means an optical encoder system having a single code scale having data or code patterns or bars formed or presented thereon or therein, as well as index patterns or bars formed or presented thereon or therein, where the data and index patterns travel together along a common single axis in a single track disposed over a corresponding single track comprising data channel light detectors, and index channel light detectors, which may or may not be aligned along the same axis as the data channel light detectors.

Figure 1:
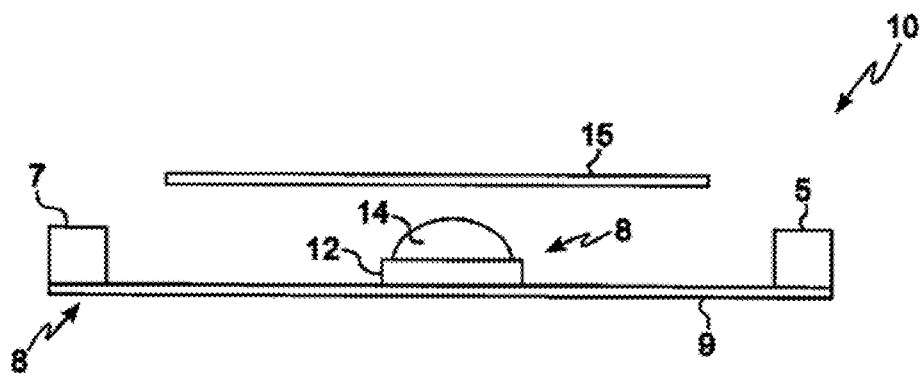
FIG. 1 shows a prior art embodiment of a reflective optical encoder system employing photointerrupters to detect end-of-motion or other limits.
Figure 2:
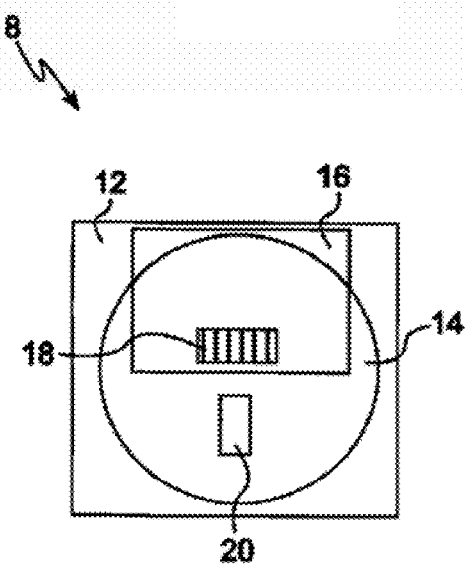
FIG. 2 shows a conventional two-channel optical encoder of the prior art.
Figure 3:
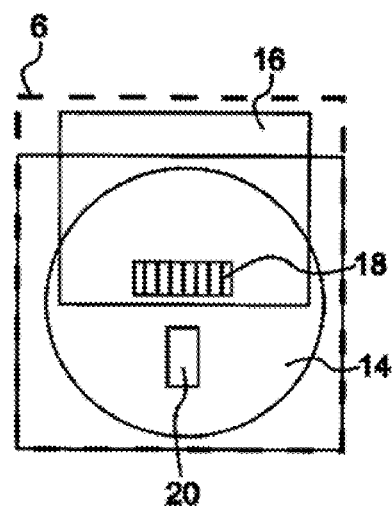
FIG. 3 shows a three-channel optical encoder of the prior art.
Figure 4A:
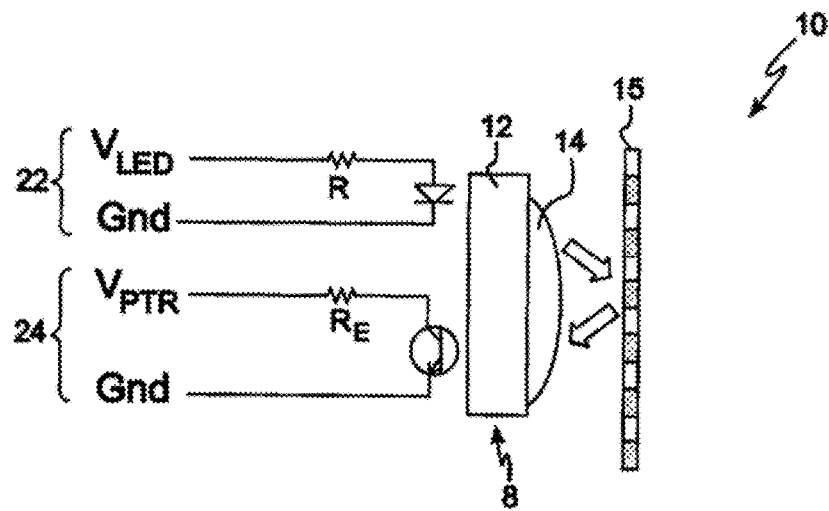
FIGS. 4(a) through 4(c) illustrate one embodiment of a reflective optical encoder 10 having index channel light detectors 22a and 22b incorporated therein.
Figure 4B:
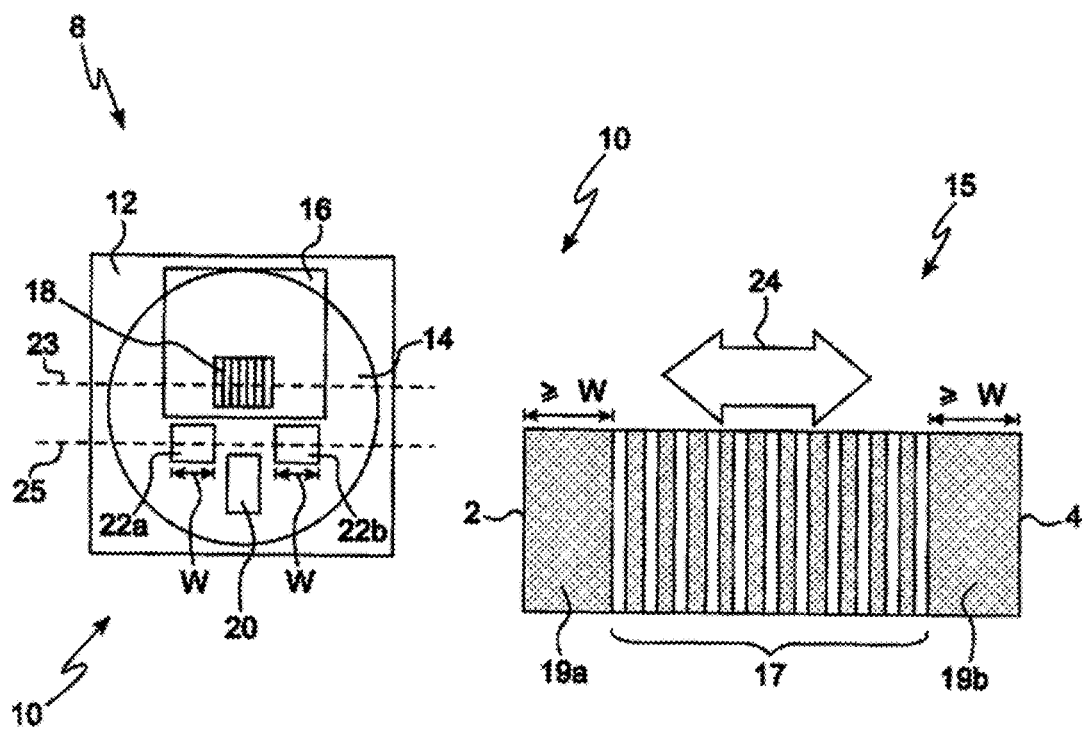

FIG. 4(a) shows a schematic diagram of circuitry associated with one embodiment of a reflective optical encoder system 10 comprising optical encoder 8 (which includes encoder substrate 12 and single dome lens 14), reflective code scale 15, light emitter driving circuitry 22 and index channel phototransistor circuitry 24. FIG. 4(b) shows additional components of the embodiment of the reflective optical encoder system 10 shown in FIG. 4(a), which as shown further comprises optical encoder 8 and code scale 15, each of which comprises, respectively, encoder substrate 12, integrated circuit 16 containing single track light detector 18, dome lens 14, phototransistors 22a and 22b, light emitter 20, and data strips 17 and index strips 19a and 19b. As shown in FIG. 4(b), code scale 15 moves laterally back and forth in the directions indicated by arrow 24. Dome lens 14 may be formed of any suitable optically transparent or transmissive material such as polycarbonate or epoxy, and is configured to focus light emitted by light emitter 20 onto code scale 15, as well as to focus light reflected from code scale 15 onto single track light detector 18 and index channel light detectors 22a and 22b.

Continuing to refer to FIGS. 4(a) and 4(b), in a preferred embodiment reflective optical encoder system comprises optical encoder 8, where encoder 8 comprises a surface mount substrate 12, light emitter 20 disposed on substrate 12 and configured to emit light therefrom, and an array of light detectors disposed on substrate 12 and arranged along common axis 23 to form single track light detector 18 having first and second ends 1 and 3. Single track light detector 18 has disposed along axis 23 a plurality of alternating sequences of pairs of A and B data channel light detectors and A/ and B/ data channel light detectors, the A and A/ light detectors, and the B and B/ light detectors, respectively, being arranged 90 degrees out of phase with respect to one another. Note that axis 23 is oriented along and parallel to azimuth 25. First and second index channel light detectors 22a and 22b are disposed on substrate 12 and have light-detecting portions of about a first width W as measured in the direction of azimuth 25. Code scale 15 comprises data strips 17 and first and second substantially non-reflective index strips 19a and 19b located at third and fourth ends 2 and 4 of code scale 15.

As shown in FIG. 4(b), code scale 15 is configured to travel parallel to axis 23 and above encoder 8, and is located and configured operably in respect of encoder 8 such that at least portions of light emitted from light emitter 20 are reflected from code scale 15 towards single track light detector 18 and index channel light detectors 22a and 22b. Light emitter 20, single track light detector 18 and index channel light detectors 22a and 22b are operably connected to processing circuitry (not shown in FIGS. 4(a) and 4(b)). Note that index channel light detectors 22a and 22b are located adjacent to first end 1 and second end 3 of single track light detector 18, and that index channel light detectors 22a and 22b do not overlap with single track light detector 18 anywhere along axis 23, or may overlap only minimally or slightly with single track light detector 18 along axis 23. Note that index strips 19a and 19b have a second width that is greater than or equal to about W as measured in the direction of azimuth 25. As the either index strip 19a or 19b moves along azimuth 25 and into alignment with index channel light detector 22a or 22b, an end-of-motion or limit signal is generated by the processing circuitry, which is then employed to stop, reveres or otherwise control the motion of a device such as a motor that is operably connected to optical encoder system 10. Note further that system 10 may include one, two or more index channel light detectors, and that such index channel light detectors may be arranged in any of a number of different configurations so long as they are positioned relatively close to ends 1 and 3 of single track light detector 18. In preferred embodiments, the index channel light detectors are positioned 1 mm or less away from ends 1 and 3 of single track light detector 18, and in more preferred embodiments are located immediately adjacent ends 1 and 3 of single track light detector 18.

Figure 4C:
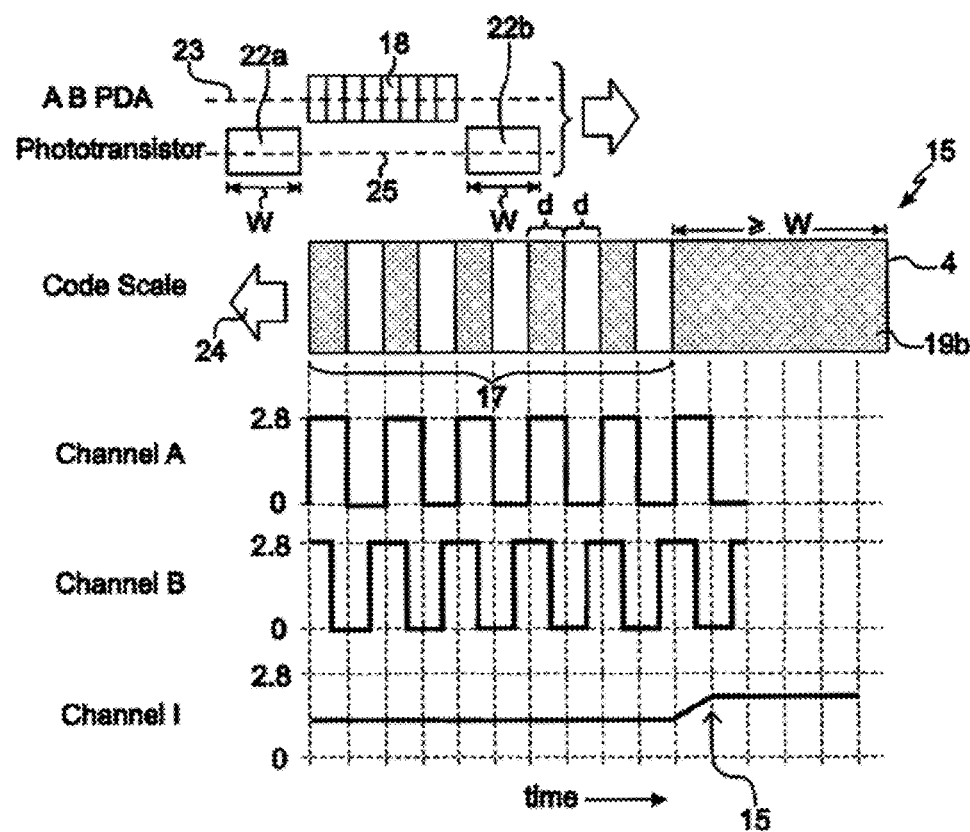

Referring now to FIG. 4(c), there are shown further operational details concerning the embodiment illustrated in FIGS. 4(a) and 4(b). As shown, code scale 15 comprises a plurality of data strips 17, each having a width d, and index strip 19b (index strip 19a and code scale end 2 are not shown in FIG. 4(c)). As data strips 17 of code scale 15 move over single track light detector 18, output signals corresponding to channels A and B are generated by appropriate processing circuitry well know to those skilled in the art. According to one embodiment, when index strip 19b moves over index channel light detector 22b such that at least half its width (which is greater than or equal to W) covers index channel light detector 22b, an index channel output signal is generated, which attains its maximum amplitude at time 15. An index channel output signal, when generated, indicates that the motor or other device to which encoder 10 is operably connected has reached an end-of-motion or other limit (as discussed above).

It is an advantage of the various embodiments disclosed herein that end-of-motion or other limits in an optical encoder system are readily detected using simple circuitry where only further minimal, if any, processing is required. For example, upon an index channel output signal achieving a simple minimum amplitude or threshold an end-of-motion signal can be triggered or generated. Thus, complicated processing circuitry is generally not required in encoder system 10 to generate index channel output signals, while the size of optical encoder system 10 is kept to a minimum. In one such embodiment, for example, surface mount substrate 12 of optical encoder 8 is only about 5 mm wide by about 5 mm long, about 4 mm wide by about 4 mm long, or about 3 mm wide by about 3 mm long. Further reductions in the size of optical encoder 8 are contemplated and possible in accordance with the various embodiments.

Figures 5A, 5B:
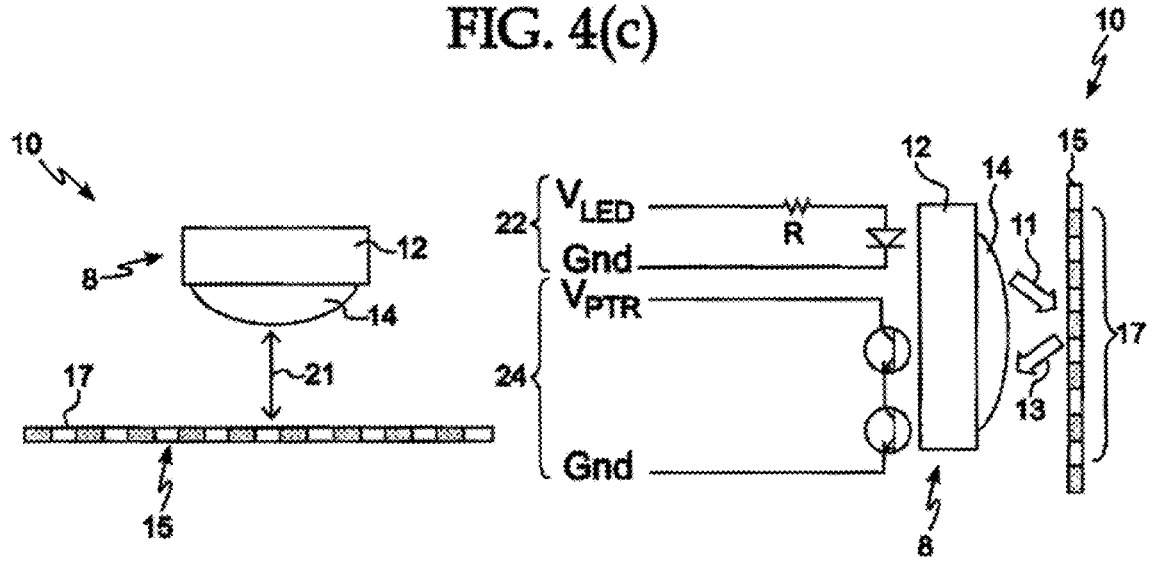
FIGS. 5(a) through 5(d) illustrate another embodiment of a reflective optical encoder 10 having index channel light detectors 22a and 22b incorporated therein, as well as one embodiment of circuitry associated therewith.

Referring now to FIGS. 5(a) through 5(d), there is shown another embodiment of reflective optical encoder system 10. As shown in FIG. 5(a), system 10 features gap 21 disposed between the tip of lens 14 and single track light detector 18 and index channel light detector(s) 22. Gap 21 can vary in height according to the particular encoder system design at hand, the application in which encoder system 10 is employed, manufacturing variations, and the like.

FIG. 5(b) shows general schematics of circuits 22 and 24. In circuit 24 two phototransistors are employed to provide a single index channel output signal corresponding to index channel light detector 22. Circuits 38 and 39 shown in FIG. 5(d) rectify problems that might otherwise arise in outputting end-of-motion or other limit signals resulting from variations in the size of gap 21. As shown in FIG. 5(d), circuit 38 comprises two phototransistors PTR1 and PTR2 arranged in series. The outputs of the two phototransistors PTR1 and PTR2 are combined at Vol. External amplifier circuit 39, which is preferably disposed outside encoder 8, comprises at least three additional components, namely biasing resistor $R_b$, Bipolar Junction Transistor (BJT) $Q_2$, and collector resistor $R_c$. The output provided by BJT $Q_2$ is $V_{o2}$.

External amplifier circuit 39 shown in FIG. 5(d) removes multiple levels from signal $V_{o1}$. Such a configuration is advantageous because the overall output from phototransistors PTR1 and PTR2 is increased significantly. Note that even without using external amplifier circuit 39, however, the output signals provided by circuit 38 have peak-to-peak values that meet TTL criteria.

Figure 5C:
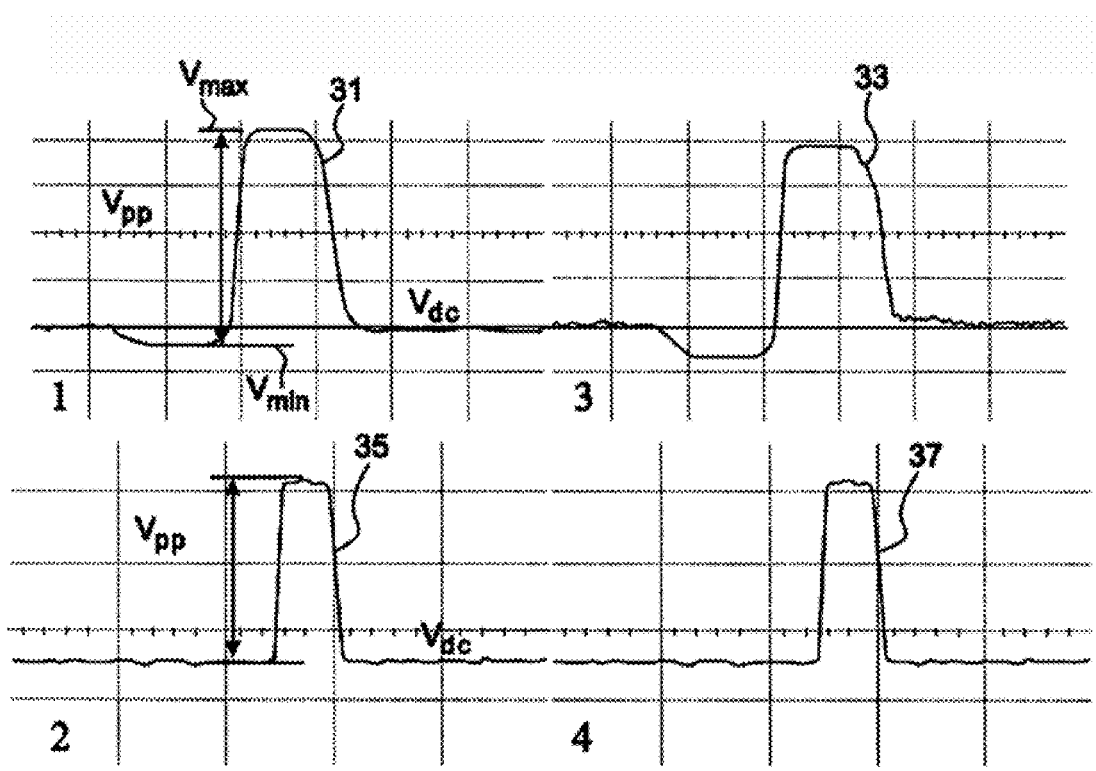
Figure 5D:
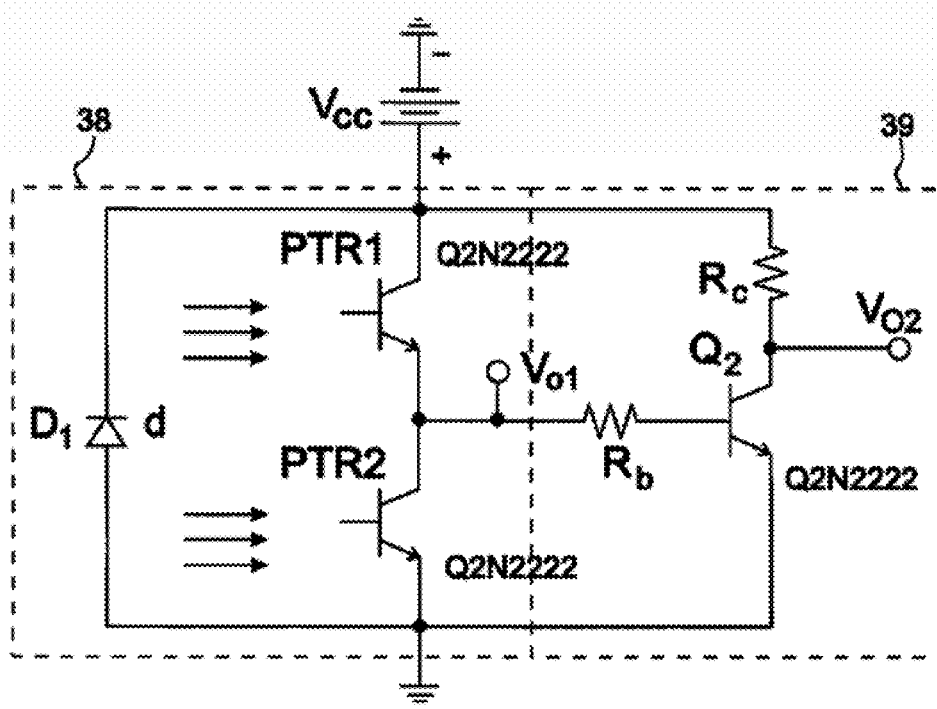

Continuing to refer to FIGS. 5(c) and 5(d), according to one embodiment voltage supply $V_{cc}$ is set at about 2.8V for all components, $R_c$ is set at about 2 kΩ, and $R_b$ is set at about 100 kΩ. Signals 1, 2, 3 and 4 shown in FIG. 5(c) result from two different gaps 21 being applied to encoder system 10. Signals 1 and 2 correspond to gap 21 being set at 150 microns, while signals 3 and 4 correspond to gap 21 being set at 650 microns. More particularly, signal 1 corresponds to $V_{o1}$ in FIG. 5(d) where gap 21 is set at 150 microns, signal 2 corresponds to $V_{o2}$ in FIG. 5(d) where gap 21 is set at 150 microns, signal 3 corresponds to $V_{o1}$ in FIG. 5(d) where gap 21 is set at 650 microns, and signal 4 corresponds to $V_{o2}$ in FIG. 5(d) where gap 21 is set at 650 microns. Signals 1 and 2 each include mid-way transitions which result in peak-to-peak values ranging between 1.51V and 1.91V. These transitions are caused by the OFF state of either one or both of PTR1 and PRT2, which results in an output of 0V. A maximum voltage is generated when PTR2 is turned OFF, yielding a voltage close to $V_{cc}$.

Referring now to signals 1 and 2 in FIG. 5(c), the emitter output at $V_{o1}$ is 2.3V peak-to-peak for a 150 micron gap 21, and the external NPN emitter output is 2.66V peak-to-peak for a 150 micron gap 21. Referring to signals 3 and 4 in FIG. 5(*c*), the emitter output at $V_{o1}$ is 2.33V peak-to-peak for a 650 micron gap 21, and the external NPN emitter output is 2.65V peak-to-peak for a 650 micron gap 21. The signal generated at $V_{o1}$ varies due to changes in optical contrast level. In order to stabilize the output signal, $V_{o1}$ is applied to external amplifier circuit 39 at base of $Q_2$, which is $R_b$. Here, signals are amplified and conditioned at $Q_2$, which yields a larger amplitude and more stable output signal $V_{o2}$. External amplifier circuit 39 eliminates $V_{dc}$, $V_{min}$ and $V_{max}$. Without external amplifier circuit 39, the multiple stages presented by output signal $V_{o1}$ might lead to ambiguous output states being generated. Overall, it will be seen that peak-to-peak variations provided by circuits 38 and 39 of FIG. 5(*d*) are small, even when the worst cases scenarios for variations in gap 21 are applied (i.e., gaps of 150 microns and 650 microns, respectively).

Referring now to FIGS. 6(*a*) through 6(*g*), there are shown various embodiments of optical encoder system 10. In FIG. 6(*a*), light emitter 20 is arranged along axis 23 in-line with single track light detector 18, while index channel light detectors 22*a* and 22*b* are offset laterally from axis 23 but arranged along azimuth 25, which is parallel to axis 23. Index channel light detectors 22*a* and 22*b* are located, respectively, adjacent to or near ends 1 and 3 of single track light detector 18, but not overlapping therewith. In an alternative embodiment, index channel light detectors 22*a* and 22*b* overlap slightly with ends 1 and 3 of single track light detector 18. When index strip 19*a* moves over index channel light detector 22*a* such that at least half its width (which is greater than or equal to W) covers index channel light detector 22*a*, an index channel output signal is generated. When index strip 19*b* moves over index channel light detector 22*b* such that at least half its width (which is greater than or equal to W) covers index channel light detector 22*b*, an index channel output signal is also generated.

In FIG. 6(*b*), light emitter 20 is laterally offset from axis 23, while index channel light detector 22 is also offset laterally from axis 23 but arranged along azimuth 25, which is parallel to axis 23. Index channel light detector 22 is located adjacent to or near end 3 of single track light detector 18, but not overlapping therewith. In an alternative embodiment, index channel light detector 22 overlaps slightly with end 3 of single track light detector 18. When index strip 19 moves over index channel light detector 22 such that at least half its width (which is greater than or equal to W) covers index channel light detector 22, an index channel output signal is generated.

In FIG. 6(*c*), light emitter 20 is laterally offset from axis 23, while index channel light detector 22 is also offset laterally from axis 23 but arranged along azimuth 25, which is parallel to axis 23. Index channel light detector 22 is located adjacent to or near end 1 of single track light detector 18, but not overlapping therewith. In an alternative embodiment, index channel light detector 22 overlaps slightly or minimally with end 1 of single track light detector 18. When index strip 19 moves over index channel light detector 22 such that at least half its width (which is greater than or equal to W) covers index channel light detector 22, an index channel output signal is generated.

In FIG. 6(*d*), light emitter 20 is arranged along or near axis 23 in-line with single track light detector 18, while index channel light detector 22 is offset laterally from axis 23 but aligned along azimuth 25, which is parallel to axis 23. Index channel light detector 22 is located adjacent to or near end 3 of single track light detector 18, but not overlapping therewith. In an alternative embodiment, index channel light detector 22 overlaps slightly with end 3 of single track light detector 18. When index strip 19 moves over index channel light detector 22 such that at least half its width (which is greater than or equal to W) covers index channel light detector 22, an index channel output signal is generated.

In FIG. 6(*e*), light emitter 20 is arranged along or near axis 23 inline with single track light detector 18, while index channel light detector 22 is offset laterally from axis 23 but arranged along azimuth 25, which is parallel to axis 23. Index channel light detector 22 is located adjacent to or near end 1 of single track light detector 18, but not overlapping therewith. In an alternative embodiment, index channel light detector 22 overlaps slightly with end 1 of single track light detector 18. When index strip 19 moves over index channel light detector 22 such that at least half its width (which is greater than or equal to W) covers index channel light detector 22, an index channel output signal is generated.

In FIG. 6(*f*), light emitter 20 is laterally offset from axis 23, while index channel light detectors 22*a* and 22*b* are arranged along or near axis 23. Index channel light detectors 22*a* and 22*b* are located, respectively, adjacent to or near ends 1 and 3 of single track light detector 18, but not overlapping therewith. In an alternative embodiment, index channel light detectors 22*a* and 22*b* overlap slightly with ends 1 and 3 of single track light detector 18. When index strip 19*a* moves over index channel light-detector 22*a* such that at least half its width (which is greater than or equal to W) covers index channel light detector 22*a*, an index channel output signal is generated. When index strip 19*b* moves over index channel light detector 22*b* such that at least half its width (which is greater than or equal to W) covers index channel light detector 22*b*, an index channel output signal is also generated.

In FIG. 6(*g*), light emitter 20 and index channel light detectors 22*a* and 22*b* are arranged along or near axis 23. Index channel light detectors 22*a* and 22*b* are located, respectively, adjacent to or near ends 1 and 3 of single track light detector 18, but not overlapping therewith. In an alternative embodiment, index channel light detectors 22*a* and 22*b* overlap slightly with ends 1 and 3 of single track light detector 18. When index strip 19*a* moves over index channel light detector 22*a* such that at least half its width (which is greater than or equal to W) covers index channel light detector 22*a*, an index channel output signal is generated. When index strip 19*b* moves over index channel light detector 22*b* such that at least half its width (which is greater than or equal to W) covers index channel light detector 22*b*, an index channel output signal is also generated.

Figure 7A:
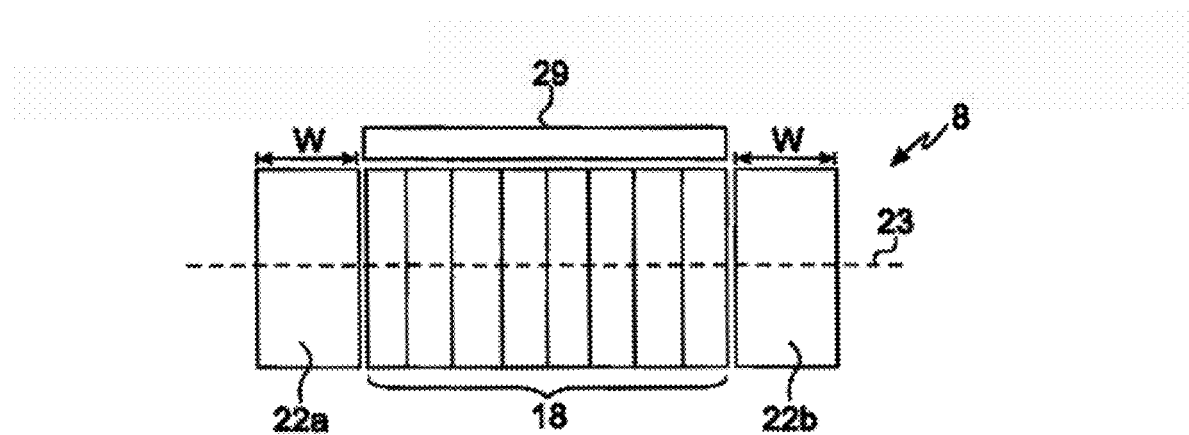
FIGS. 7(a) and 7(b) illustrate a still further embodiment of reflective optical encoders 10 having index channel light detectors 22a and 22b and monitor 29 incorporated therein.
Figure 7B:
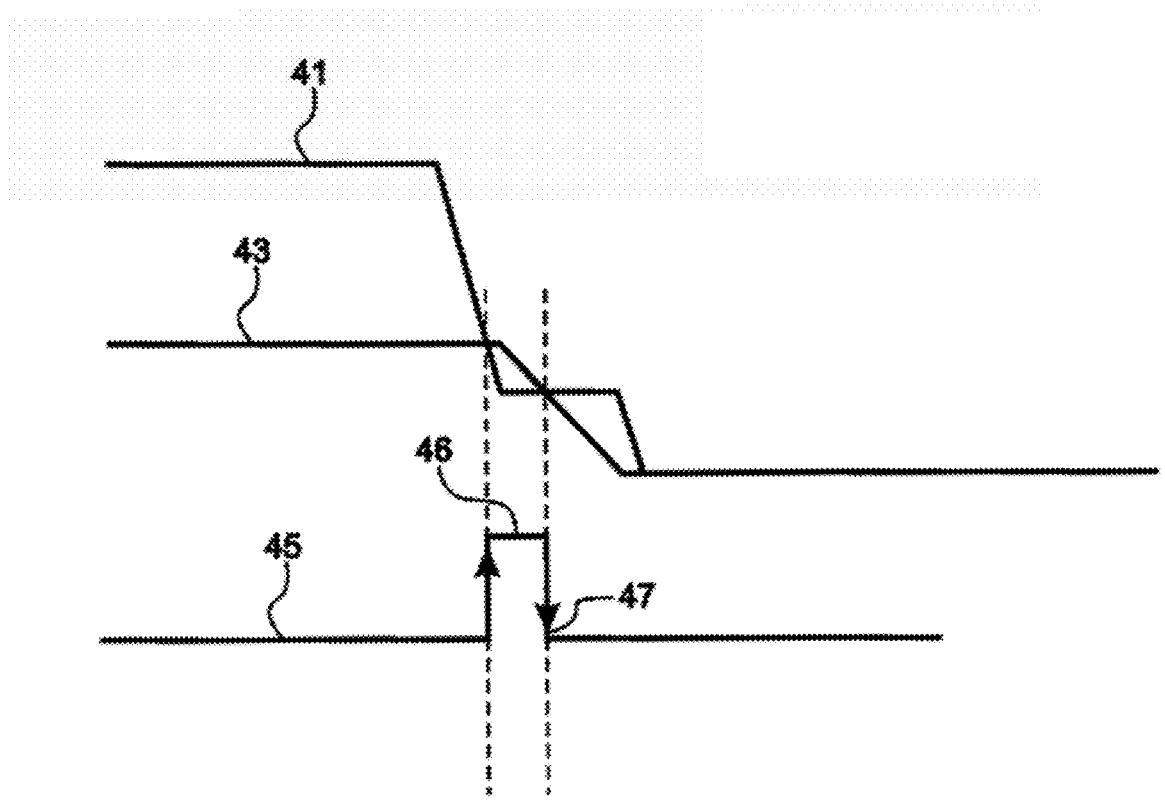

In FIG. 7(*a*), monitor channel 29 supplements the functionality provided by index channel light detectors 22*a* and 22*b*. Monitor channel 29 is located adjacent to single track light detector 18, but laterally offset therefrom along azimuth 25. In one embodiment, when index strips 19*a* or 19*b* move over index channel light detectors 22*a* or 22*b* such that at least half their respective widths (which are greater than or equal to W) cover portions of index channel light detectors 22*a* and 22*b*, initial index channel output signals are generated, which are summed to form signal 41 shown in FIG. 7(*b*). The final index channel output signal is generated by comparing the amplified summed photocurrents from index channel light detectors 22*a* and 22*b* (signal 41 in FIG. 7(*b*)) with an output signal generated by monitor channel 29 (see signal 43 in FIG. 7(*b*)). When signals 41 and 43 intersect, a third channel output signal 45 is generated, which can also be gated to the channel A or/and channel B signals to produced index pulse 46 of signal 45 in FIG. 7(*b*). An indication of end-of-motion or other limit is provided at termination 47 of pulse 46.

Those skilled in the art will now understand that a virtually infinite number of suitable permutations and combinations of index channel light detector, data channel light detector, and code wheel index and data strip widths may be employed according to the teachings disclosed herein.

Note that the fundamental resolution achieved by optical encoder system 10 before any interpolation is subsequently performed on various output signals provided thereby may be enhanced and interpolated by using, for example, a digital signal processor ("DSP"), a processor, a microprocessor, a CPU, an application specific integrated circuit ("ASIC"), an integrated circuit ("IC") or any other suitable signal processing or computational electronic circuitry. Such interpolation techniques can extend further the fundamental or basic resolution provided by encoder system 10, as will be understood by those skilled in the art.

In various embodiments, reflective optical encoder 10 may comprise a single dome lens 14 comprising an optically transparent or transmissive material, and may also comprise an optically opaque light barrier disposed between light emitter 20 and single track light detector 18, the light barrier being configured to prevent or inhibit stray light rays from impinging upon single track light detector 18. The data channel light detectors 18 and the index channel light detectors 22a and 22b may also be disposed upon a single integrated circuit die. The substrate upon which light emitter 20 and single track light detector 18 are disposed may be a printed circuit board, a lead frame, comprise plastic, be formed from a polymer, or comprise any other suitable composition or material.

The various embodiments of the invention solve certain problems and have certain advantages. In some embodiments, reflective optical encoder system 10 permits the size and cost of the system to be reduced, seeing as two data channels and one or more index channels can be disposed over a small area of substrate 12. The small footprints and sizes permitted by the various configurations disclosed herein permit small encoders to be constructed. Moreover, the area over which light is spread by the emitter and the code scale can be made smaller since the surface areas of the data channel and index channel light detectors can be reduced using the single track light detector and corresponding index channel light detectors disclosed herein. Sensitivity to radial misalignments between the code scale and the light detector is reduced as detectors spread over a small area are employed. As a result, misalignments between the code wheel and the light detector are reduced, and manufacturing and assembly costs are reduced because no special equipment is required to align the code scale with the light detector. Some embodiments eliminate complicated electronic circuitry required in the prior art since no additional circuitry must be used to boost current outputs, or to perform complicated logic operations to generate the index channel output signal. Various embodiments of the optical reflective encoder also permit much higher resolutions to be achieved than possible heretofore, notwithstanding the smaller size and footprint of the encoder.

The various embodiments are relatively simple and easy to implement, permit the use of smaller light emitting zones than has heretofore been possible, resulting in smaller packages, reduce the sensitivity of the code wheel and the light detector photodiode arrays to misalignment, reduce die and assembly cost, use conventional and simple electronic circuitry, and eliminate the need for circuit redesign. In addition, in some embodiments different index pulse widths can be generated according to the particular application at hand since the index channels 22a and/or 22b not share photodiodes with data channels A, A/, B and B/.

Included within the scope of the present invention are methods of making and having made the various components, devices and systems described herein. By way of example, methods of making a reflective optical encoder are provided, which according to one embodiment comprise attaching a light emitter to a substrate, the light emitter being configured to emit light therefrom, attaching an array of light detectors on the substrate and arranging the array of light detectors along a common axis to form a single track light detector having first and second ends, the single track light detector having disposed along the axis a plurality of alternating sequences of pairs of A and B data channel light detectors and A/ and B/ data channel light detectors, the A and A/ light detectors, and the B and B/ light detectors, respectively, being arranged 90 degrees out of phase with respect to one another, the axis being oriented along and parallel to an azimuth, and attaching at least a first index channel light detector on the substrate having a light-detecting portion of about a first width W as measured in the direction of the azimuth, and making a code scale comprising data strips and at least a first substantially non-reflective index strip located at a third end of the code scale, and configuring the code scale to travel parallel to the axis and above the encoder such that the code scale is located and configured operably in respect of the encoder such that at least portions of light emitted from the light emitter are reflected from the code scale towards the single track light detector and the index channel light detector, where the light emitter, the single track light detector and the index channel light detector are operably connected to processing circuitry, the index channel light detector is located adjacent to the first end or the second end of the single track light detector, the index channel light detector does not overlap with the single track light detector anywhere along the axis, the first index strip has a second width greater than or equal to about W as measured in the direction of the azimuth, and as the first index strip moves along the azimuth and into alignment with the index channel light detector a first end-of-motion or limit signal is generated by the processing circuitry.

Such methods may further comprise locating the first or second end of the single track light detector and the index channel light detector immediately adjacent one another, locating the first or second end of the single track light detector and the index channel light detector a distance of 1 mm or less from one another, attaching a second index channel light detector to the substrate having a light-detecting portion of about the first width W as measured along the azimuth, and forming the single track light detector, the at least one index channel light detector, and the light emitter in a single integrated circuit die.

In further embodiments, the first end 1 or the second end 3 of single track light detector 18 and the at least one index channel light detector 22 are located immediately adjacent one another, or are located a distance of 1 mm or less from one another. Code scale 15 and index strip 19 may be configured to move directly over index channel light detector 22. First and second index channel light detectors 22a and 22b may both be aligned along azimuth 25 and parallel to axis 23. First and second index channel light detectors 22a and 22b may be located along axis 23. One or more of first index channel light detector 22a, second index channel light detector 22b, and light emitter 20 may be laterally offset from axis 23. Light emitter 20 and first and second index channel light detectors 22a and 22b may be located along axis 23. Light emitter 20 may be aligned at least partially with axis 23. The processing circuitry may be incorporated into an integrated circuit disposed on substrate 12. Light emitter 20 may be a light emitting diode ("LED") or other suitable light source. The first end-of-motion or limit signal may be generated by the processing circuitry when at least half of the width W of first index strip 19a has moved along azimuth 25 into alignment with index channel light detector 22a. The first or second index channel light detectors may be a phototransistor ("PTR"). The light detectors of single track light detector 18 may be photodiodes. Encoder system 10 may be leadless. Single track light detector 18 and the at least one index channel light detector 22 may be integrated into a single integrated circuit die, and such a single integrated circuit may have a width and a length less than about 5 mm. Substrate 12 may be a printed circuit board, a lead frame, comprise plastic or be formed from a polymer.

In the various embodiments of the invention, a reduced number of sensor components leads to a reduction in number of assembly steps required. No photointerrupter is required to generate one or more indexing output signals. The reduced complexity leads to a reduction in the total number of defects that occur in back-end assembly. Fewer sensors and reduced complexity are combined to produce a significantly lower cost reflective optical encoder than has heretofore been known.

Various embodiments of the invention are contemplated in addition to those disclosed hereinabove. For example, transmissive optical encoders incorporating the single track light detectors and index channel light detectors and other features of the embodiments described hereinabove are specifically contemplated.

The above-described embodiments should be considered as examples of the present invention, rather than as limiting the scope of the invention. In addition to the foregoing embodiments of the invention, review of the; detailed description and accompanying drawings will show that there are other embodiments of the invention. Accordingly, many combinations, permutations, variations and modifications of the foregoing embodiments of the invention not set forth explicitly herein will nevertheless fall within the scope of the invention.

We claim:

1. A reflective optical encoder system, comprising:
   (a) an encoder, comprising:
      (i) a surface mount substrate;
      (ii) a light emitter disposed on the substrate and configured to emit light therefrom;
      (iii) an array of light detectors disposed on the substrate and arranged along a common axis to form a single track light detector having first and second ends, the single track light detector having disposed along the axis a plurality of alternating sequences of pairs of A and B data channel light detectors and A/ and B/ data channel light detectors, the A and A/ light detectors, and the B and B/ light detectors, respectively, being arranged 90 degrees out of phase with respect to one another, the axis being oriented along and parallel to an azimuth, and
      (iv) at least a first index channel light detector disposed on the substrate and having a light-detecting portion of about a first width W as measured in the direction of the azimuth, and
   (b) a code scale comprising data strips and at least a first substantially non-reflective index strip located at a third end of the code scale, the code scale being configured to travel parallel to the axis and above the encoder, the code scale being located and configured operably in respect of the encoder such that at least portions of light emitted from the light emitter are reflected from the code scale towards the single track light detector and the index channel light detector;
   wherein the light emitter, the single track light detector and the index channel light detector are operably connected to processing circuitry, the index channel light detector is located adjacent to the first end or the second end of the single track light detector, the index channel light detector does not overlap with the single track light detector anywhere along the axis, the first index strip has a second width greater than or equal to about W as measured in the direction of the azimuth, and as the first index strip moves along the azimuth and into alignment with the index channel light detector a first end-of-motion or limit signal is generated by the processing circuitry.

2. The reflective optical encoder system of claim 1, wherein the first or second end of the single track light detector and the index channel light detector are located immediately adjacent one another.

3. The reflective optical encoder system of claim 1, wherein the first or second end of the single track light detector and the index channel light detector are located a distance of 1 mm or less from one another.

4. The reflective optical encoder system of claim 1, wherein the code scale and index strip are configured to move directly over the index channel light detector.

5. The reflective optical encoder system of claim 1, further comprising a second index channel light detector disposed on the substrate and having a light-detecting portion of about the first width W as measured along the azimuth.

6. The reflective optical encoder system of claim 5, wherein the second index channel light detector is located adjacent the first end or the second end of the single track light detector opposite the end of the single track light detector at which the first index channel light detector is located.

7. The reflective optical encoder system of claim 6, wherein the first and second ends of the single track light detector and the first and second index channel light detectors, respectively, are located immediately adjacent one another.

8. The reflective optical encoder system of claim 6, wherein the first and second ends of the single track light detector and the first and second index channel light detectors, respectively, are located a distance of 1 mm or less from one another.

9. The reflective optical encoder system of claim 5, wherein the first and second index channel light detectors are both aligned along the azimuth and parallel to the axis.

10. The reflective optical encoder system of claim 5, wherein at least one of the first and second index channel light detectors is located along the axis.

11. The reflective optical encoder system of claim 5, wherein one or more of the first index channel light detector, the second index channel light detector, and the light emitter is laterally offset from the axis.

12. The reflective optical encoder system of claim 5, wherein the light emitter and the first and second index channel light detectors are located along the axis.

13. The reflective optical encoder system of claim 1, wherein the light emitter is aligned at least partially with the axis.

14. The reflective optical encoder system of claim 1, wherein the code scale further comprises a second substantially non-reflective index strip located at a fourth end of the code scale.

15. The reflective optical encoder system of claim 14, wherein the second index strip has a second width greater than or equal to W as measured in the first direction, and as the second index strip moves along the azimuth and into alignment with the index channel light detector a second end-of-motion or limit signal is generated by the processing circuitry.

16. The reflective optical encoder system of claim 1, wherein the processing circuitry is incorporated into an integrated circuit disposed on the substrate.

17. The reflective optical encoder system of claim 1, wherein the light emitter is a light emitting diode ("LED").

18. The reflective optical encoder system of claim 1, wherein the first end-of-motion or limit signal is generated by the processing circuitry when at least half of the width of the first index strip has moved along the first azimuth and into alignment with the index channel light detector.

19. The reflective optical encoder system of claim 1, wherein the first or second index channel light detector is a phototransistor ("PTR").

20. The reflective optical encoder system of claim 1, wherein the light detectors of the single track light detector are photodiodes.

21. The reflective optical encoder system of claim 1, wherein the encoder system is leadless.

22. The reflective optical encoder system of claim 1, wherein the single track light detector and the at least one index channel light detector are integrated into a single integrated circuit die.

23. The reflective optical encoder system of claim 22, wherein the single integrated circuit has a width and a length less than about 5 mm, about 4 mm, or about 3 mm.

24. The reflective optical encoder system of claim 1, further comprising a single dome lens disposed over the single track light detector, the index channel light detector, and the light emitter.

25. The reflective optical encoder system of claim 1, further comprising an optically opaque light barrier disposed between the light emitter and the single track light detector, the light barrier being configured to prevent or inhibit stray light rays from impinging upon the single track light detector.

26. The reflective optical encoder system of claim 1, wherein the substrate is a printed circuit board, a lead frame, comprises plastic or is formed from a polymer.

27. A method of making a reflective optical encoder system, comprising:
(a) making an encoder, comprising:
(i) attaching a light emitter to a substrate, the light emitter being configured to emit light therefrom;
(ii) attaching an array of light detectors on the substrate and arranging the array of light detectors along a common axis to form a single track light detector having first and second ends, the single track light detector having disposed along the axis a plurality of alternating sequences of pairs of A and B data channel light detectors and A/ and B/ data channel light detectors, the A and A/ light detectors, and the B and B/ light detectors, respectively, being arranged 90 degrees out of phase with respect to one another, the axis being oriented along and parallel to an azimuth, and
(iii) attaching at least a first index channel light detector on the substrate having a light-detecting portion of about a first width W as measured in the direction of the azimuth, and
(b) making a code scale comprising data strips and at least a first substantially non-reflective index strip located at a third end of the code scale, and configuring the code scale to travel parallel to the axis and above the encoder such that the code scale is located and configured operably in respect of the encoder such that at least portions of light emitted from the light emitter are reflected from the code scale towards the single track light detector and the index channel light detector;
wherein the light emitter, the single track light detector and the index channel light detector are operably connected to processing circuitry, the index channel light detector is located adjacent to the first end or the second end of the single track light detector, the index channel light detector does not overlap with the single track light detector anywhere along the axis, the first index strip has a second width greater than or equal to about W as measured in the direction of the azimuth, and as the first index strip moves along the azimuth and into alignment with the index channel light detector a first end-of-motion or limit signal is generated by the processing circuitry.

28. The method of claim 27, further comprising locating the first or second end of the single track light detector and the index channel light detector immediately adjacent one another.

29. The method of claim 27, further comprising locating the first or second end of the single track light detector and the index channel light detector a distance of 1 mm or less from one another.

30. The method of claim 27, further comprising attaching a second index channel light detector to the substrate having a light-detecting portion of about the first width W as measured along the azimuth.

31. The method of claim 27, further comprising forming the single track light detector, the at least one index channel light detector, and the light emitter in a single integrated circuit die.

* * * * *